March 6, 1934.  J. P. TARBOX  1,949,818

TRUSS MEMBER FOR AIRCRAFT AND THE LIKE

Filed July 22, 1930

INVENTOR.

J. M. P. Tarbox

Patented Mar. 6, 1934

1,949,818

UNITED STATES PATENT OFFICE 1,949,818

TRUSS MEMBER FOR AIRCRAFT AND THE LIKE

John P. Tarbox, Philadelphia, Pa., assignor to Edw. G. Budd Mfg. Company, Philadelphia, Pa., a corporation of Pennsylvania Application July 22, 1930, Serial No. 469,817

2 Claims. (Cl. 189—37)

The truss comprising the present invention is particularly adapted for use in connection with aircraft manufacture, but not exclusively so, as it has many other adaptations. The truss manufactured in accordance with the principles of the present invention is simply a structural assembly that may be used as a rib, spar, beam, girder, strut, tie, column, or the like, wherever its use may be found applicable.

Modern airplane manufacturers prefer to form truss members of material which is extremely thin in gauge and small in cross section. They prefer to form the truss member entirely of light sheet metal assembled by the easiest method of joining the parts, namely, by spot welding.

The principal object of the present invention is to provide a truss structure in which the parts are readily formed out of flat sheet metal stock in such a manner that they are readily susceptible to joinder by a simple process of spot welding, the means whereby this comparatively simple and efficient joinder may be effected, also serving to strengthen and reinforce the truss construction. Extreme rigidity of construction, together with cheapness in the cost of manufacture, and lightness without sacrifice of strength are the paramount features of the invention that have been borne in mind in its production and development.

To accomplish the aims and objects set forth, the invention contemplates the provision of a pair of load carrying members or cap strips, beaded in a fashion conducive, not only to maximum rigidity obtained by the reinforcing action of the beading, but also to facility of attachment of struts which extend between these cap strips in continuous zig zag fashion throughout substantial distances between the cap strips to provide lattice work for spacing the strips apart.

In carrying out the principles of the present invention, these objects are obtained generally by the use of light gauge sheet metal stock preferably of rustless alloy steel built up into a hollow truss structure secured together by spot welding, maximum strength being obtained by forming, not only the truss assembly itself in the form of a combination of triangles, but by forming the constituent cap strips with a system of triangulated beading for insuring maximum rigidity in these load carrying members.

Other objects of the invention, not at this time more particularly enumerated, will become more readily apparent as the nature of the invention is better understood, and the same consists in the novel construction, combination, and arrangement of parts shown in the accompanying single sheet of drawing, in which:

Fig. 1 is a fragmentary side elevation of the truss in a form adapted for use as a girder, column, beam, or the like.

In the above five views, like characters of reference are employed to designate like parts throughout.

Two chord members are designated at 10. They are identical and the description of one suffices for the other. Each chord member comprises an elongated substantial flat sheet of material having side flanges 12 for reinforcing the same. A plurality of corrugations or beads are formed longitudinally in the chord members and extend te full length of the same. While any number of these corrugations may be formed in the present instance, three are shown, and these three longitudinally extending corrugations are designated at 13, 14, and 15. The corrugations 13 and 15 extend longitudinally of the chord members and are spaced inwardly from the edges of the chord members to provide ribs 21 on each side of the chord members. The corrugations 14 are provided centrally of the chord members.

Figure 1:
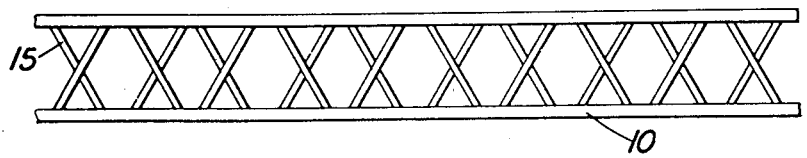
Figure 2:
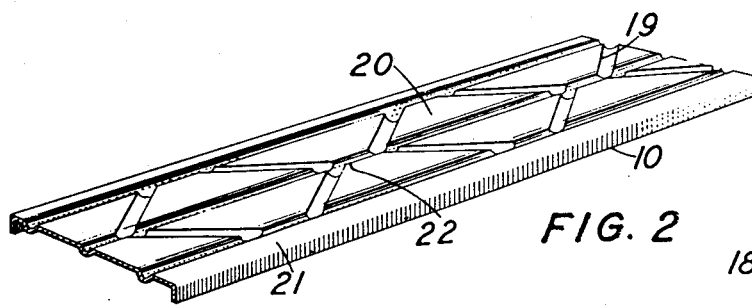
Fig. 2 is a perspective view of one of the cap strips which forms a constituent part of the truss assembly.

A plurality of additional corrugations 19 extend between the corrugations 13 and 14 and between the corrugations 14 and 15. These latter corrugations 19 extend at an angle to the longitudinal axis of the chord members and are formed in such a manner as to provide a triangulated structure. In other words, the various corrugations formed in the sheet material provide a number of raised projections 20, which projections are substantially in the form of triangles, or to be more specific, in the form of trapezoids having very short minor bases. These trapezoidal portions are arranged in pairs on each side of the longitudinal corrugations 14 in such a manner that the major base 23 of the trapezoidal projections of each pair are directly opposed to each other in the case of alternate pairs of projections, while the minor base portions of each alternate pair are also directly opposed. To express the arrangement of the raised portions in other language, two rows of trapezoidal raised portions are provided longitudinally of each chord member. The centers of each raised portion in each row are in line. The raised portions in both rows are arranged in pairs side by side with alternate adjacent raised portions having their major base portions opposed, and also alternate raised portions in both rows having their minor base portions directly opposed. Such a structure is clearly shown in Fig. 2.

Figure 3:
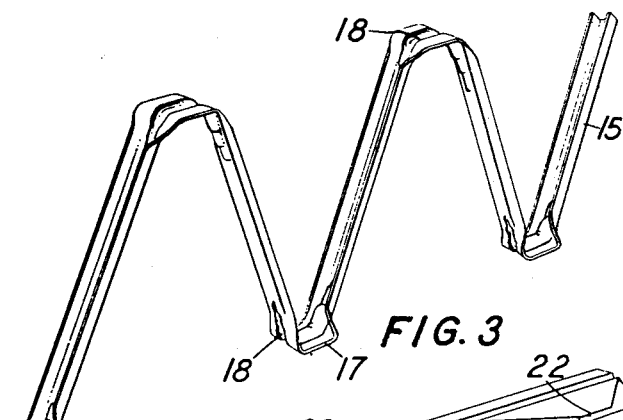
Fig. 3 is a perspective view of the lattice-like structure construction which connects the cap strips together.
Figure 4:
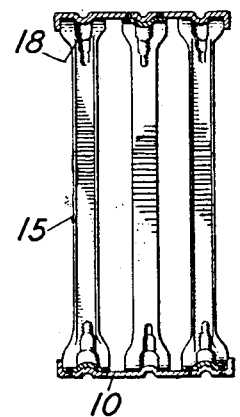
Fig. 4 is a perspective view of a section of the truss construction.
Figure 5:
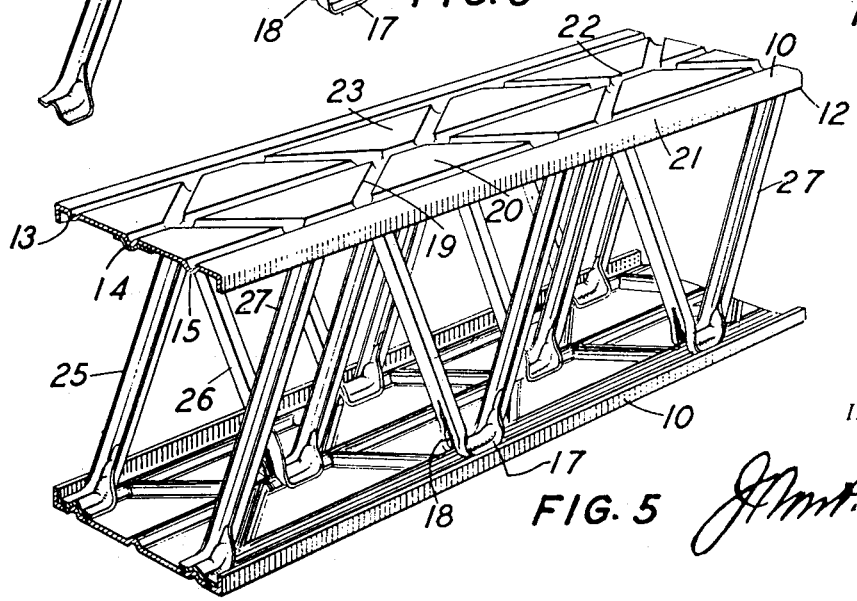
Fig. 5 is a sectional view taken substantially along the line 5—5 of Fig. 1, or in other words, taken transversely through the truss section.

The corrugations 13, 14, and 15 formed in the chord members provide ribs on the inside surface of the chord members and each chord member is spaced by intervening trussing in the form of lattice work comprising a plurality of sets 25, 26, and 27 of Warren trussing. This trussing is rolled and die formed from continuous strip stock of alloy steel of high physical characteristics in the form shown in Fig. 3. It is of channel cross section in the main bodies of its struts, but of plane form at its apices 17, the channels being flattened out, or the strip stock not being rolled completely to channel form in the regions of the apexes 17. The full flattened portions extend substantially transversely of the apices and are gradually merged into the channel cross sections in the bodies of the struts. Extending across the flattened apexes 17 and down into the channels themselves are centrally located longitudinally extending reinforcing beads 18 whose cross sections are interiorly of the truss and whose sections are a maximum in the flattened portions and are gradually faded out into the full channel section portions. The different sets of trussing 25, 26, and 27 have their points of connection to the chord members staggered, as clearly shown in Fig. 5.

The beading 18 in the apexes of the trussing is positioned on the rib formed by corrugations 13, 14, and 15 at points adjacent the minor bases of the trapezoidal projections, and is spot welded to the bases on the inner face of each chord member. Preferably the sets of trussing are secured in place progressively from one end of the chord member to the other, whereby the built up structure is progressed from one end to the other through a welding machine of standard form. Thus much time is saved, since the welding operation can be carried on rapidly and but a single jigging operation is necessary to relatively position the parts.

It is apparent from the above description, that the raised triangular projections provide very rigid chord members. These chord members carry substantially all of the load, and since a triangle generally is the strongest of geometrical figures, the triangulated system is the most desirable. Furthermore, since the trussing is secured to the inner side of the chord members adjacent the apex of each triangle, additional rigidity in construction is effected. The number of sets of Warren trussing employed may be varied as also may its angularity. Similarly, the number of corrugations provided may be varied to agree with the number of sets of trussing. The chord members may be equally spaced throughout the length of the spar, or if desired, the distance between the chord members may be varied in different spars or in the same spar, for example, where the structure is to be employed as a rib in an airplane wing, the chord members may approach each other to provide a tapered structure.

The invention is not to be limited to the exact arrangement of parts shown in the accompanying drawing or described in the specification as the same is subject to various modifications and all such modifications are within the purview of the annexed claims.

What I claim is:

1. A truss comprising relatively wide chord members of sheet stock and a plurality of spaced longitudinally extending truss members interconnecting the chord members together with rectilinear deformations of the chord members between adjacent points of connection between respective chords, and between said points of truss connection.

2. A truss comprising relatively wide chord members of sheet stock and a plurality of spaced longitudinally extending truss members interconnecting the chord members together with rectilinear deformations of the chord members between adjacent points of connection between respective chords, and between said points of truss connection and said deformations forming triagular portions whose apexes are spaced apart and having the truss points of connection in the junction spaces of said triangles.

JOHN P. TARBOX.